United States Patent
German

(10) Patent No.: US 12,539,155 B2
(45) Date of Patent: Feb. 3, 2026

(54) BONE REDUCTION CLAMP

(71) Applicant: David J. German, Erie, PA (US)

(72) Inventor: David J. German, Erie, PA (US)

( * ) Notice: Subject to any disclaimer, the term of this patent is extended or adjusted under 35 U.S.C. 154(b) by 418 days.

(21) Appl. No.: 17/724,215

(22) Filed: Apr. 19, 2022

(65) Prior Publication Data

US 2022/0330996 A1    Oct. 20, 2022

Related U.S. Application Data

(60) Provisional application No. 63/177,039, filed on Apr. 20, 2021.

(51) Int. Cl.
*A61B 17/88* (2006.01)
*A61B 17/82* (2006.01)
*A61B 17/00* (2006.01)

(52) U.S. Cl.
CPC ...... *A61B 17/8866* (2013.01); *A61B 2017/00407* (2013.01); *A61B 2017/00424* (2013.01)

(58) Field of Classification Search
CPC ............ A61B 17/8866; A61B 17/82; A61B 2017/00407
See application file for complete search history.

(56) References Cited

U.S. PATENT DOCUMENTS

| | | | | |
|---|---|---|---|---|
| 2,291,413 | A * | 7/1942 | Siebrandt | A61B 17/8861 606/103 |
| 5,217,463 | A * | 6/1993 | Mikhail | A61B 17/02 606/88 |
| 5,578,032 | A * | 11/1996 | Lalonde | A61B 17/282 606/205 |
| 7,722,625 | B2 * | 5/2010 | Sanders | A61B 17/8866 606/105 |
| 9,198,676 | B2 * | 12/2015 | Pilgeram | A61B 17/1764 |
| 9,463,012 | B2 * | 10/2016 | Bonutti | A61B 17/0469 |
| 11,457,959 | B2 * | 10/2022 | Semingson | A61B 17/7053 |
| 2006/0293691 | A1 * | 12/2006 | Mitra | A61B 17/8861 606/103 |
| 2022/0110648 | A1 * | 4/2022 | Hurley | A61B 17/8861 |

* cited by examiner

*Primary Examiner* — Tracy L Kamikawa
(74) *Attorney, Agent, or Firm* — K&L Gates LLP

(57) ABSTRACT

Disclosed is a surgical instrument that comprises a handle, a trigger pivotably coupled to the handle, wherein the trigger is movable between a first position and a second position. The surgical instrument further comprises a shaft extending from the handle, wherein the shaft comprises a distal end forming a hook. The surgical instrument further comprises a clamp arm extending from the handle and mechanically coupled to the trigger, wherein movement of the trigger from the first position toward the second position moves the clamp arm toward the hook. The surgical instrument further comprises a ratchet mechanism mechanically coupled to the clamp arm, wherein the ratchet mechanism is configured to prevent movement of the trigger toward the first position at incremental positions between the first position and the second position.

20 Claims, 17 Drawing Sheets

BONE REDUCTION CLAMP

CROSS-REFERENCE TO RELATED APPLICATION

The present application claims priority under 35 U.S.C. § 119(e) to U.S. Provisional Application No. 63/177,039, entitled "BONE REDUCTION CLAMP", filed on Apr. 20, 2021, the entire disclosure of which is incorporated by reference herein.

BACKGROUND

The present disclosure relates to surgical instruments for clamping bone. These types of instruments may be used for repairing bone fractures. For example, this type of instrument can be used in orthopedic surgery fixation for diaphyseal fractures of the femur bone.

SUMMARY

In one general aspect, the present disclosure provides a surgical instrument, including: a handle; a trigger pivotably coupled to the handle, where the trigger is movable between a first position and a second position; a shaft extending from the handle, where the shaft includes a distal end forming a hook; a clamp arm extending from the handle and mechanically coupled to the trigger, where movement of the trigger from the first position toward the second position moves the clamp arm toward the hook. The surgical instrument also includes a ratchet mechanism mechanically coupled to the clamp arm, where the ratchet mechanism is configured to prevent movement of the trigger toward the first position at incremental positions between the first position and the second position.

In another general aspect, the present disclosure provides a surgical instrument, including: a handle; a trigger pivotably coupled to the handle, where the trigger is movable between a first position and a second position; a shaft extending from the handle, where the shaft includes a distal end forming a hook; a clamp arm extending from the handle and mechanically coupled to the trigger, where movement of the trigger from the first position to the second position moves the clamp arm toward the hook, and where the hook includes a cable pathway. The surgical instrument also includes a locking mechanism mechanically coupled to the clamp arm, where the locking mechanism is configured to prevent movement of the trigger toward the first position at incremental positions between the first position and the second position.

In another general aspect, the present disclosure provides a surgical instrument, including: a handle; a trigger pivotably coupled to the handle, where the trigger is movable between a first position and a second position; a shaft extending from the handle, where the shaft includes a distal end forming a hook; a clamp arm extending from the handle and mechanically coupled to the trigger, where movement of the trigger from the first position to the second position moves the clamp arm toward the hook. The surgical instrument also includes a locking mechanism mechanically coupled to the clamp arm, where the locking mechanism is configured to prevent movement of the trigger toward the first position at incremental positions between the first position and the second position.

BRIEF DESCRIPTION OF THE FIGURES

The novel features of the various aspects are set forth with particularity in the appended claims. The described aspects, however, both as to organization and methods of operation, may be best understood by reference to the following description, taken in conjunction with the accompanying drawings in which:

Figure 1:
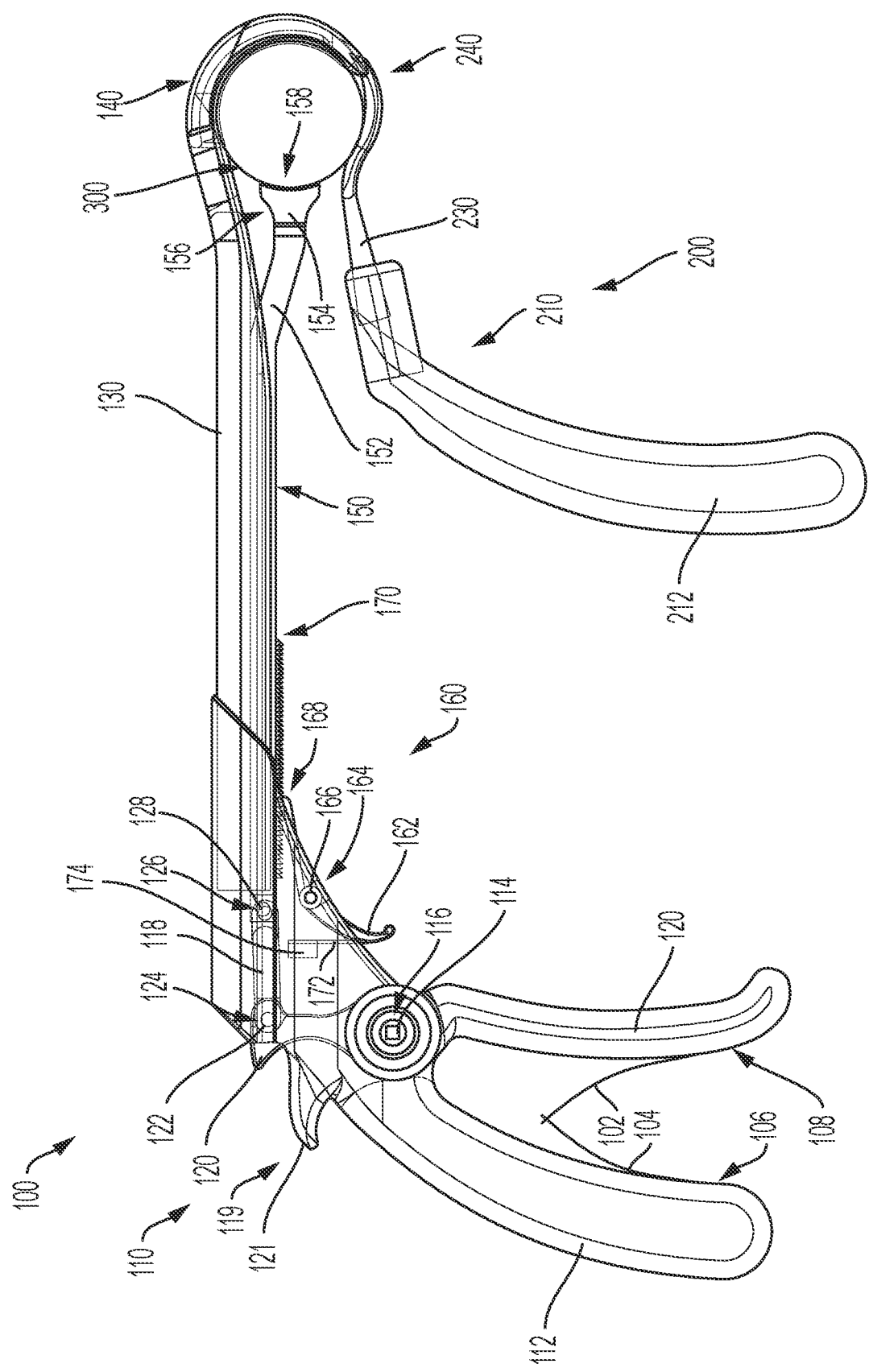
FIG. 1 is an elevation view of an assembly including a surgical instrument and a surgical accessory clamped around a bone, according to at least one aspect of the present disclosure.

Corresponding reference characters indicate corresponding parts throughout the several views. The exemplifications set out herein illustrate various disclosed embodiments, in one form, and such exemplifications are not to be construed as limiting the scope thereof in any manner. Certain components are illustrated as transparent in certain views for illustrative purposes.

DESCRIPTION

In various instances, in order to repair a diaphyseal fracture of the femur bone, a bone reduction clamp may be used to clamp onto the bone. Designs of the clamp typically require two hands to operate and move the clamp from an open configuration to a closed configuration. Additionally, if a cerclage cable is required in the repair of the diaphyseal fracture, then an additional surgical instrument may be needed to route the cable around the bone. Existing cable-passing hooks frequently require lifting and leveraging of surrounding muscle tissue in order to fully rotate the passing hook around and underneath the bone to be visible for insertion and passage of the cerclage cable. Large musculature and/or large thigh girth can be an impediment to traditional hooking movement of the clamp and/or cable passage. In various instances, the bone reduction clamp may need to be moved and clamped again to make room for the cable-passing hook, which can cause additional fracture exposure and the potential of instrument crowding within the wound. In some instances, this process can lead to more muscle being stripped away from the bone and increased blood loss.

In various aspects of the present disclosure, a bone reduction clamp and cerclage cable passing means can be incorporated into the same surgical instrument, as further described herein. For example, the bone reduction clamp could close around the bone and a cable pathway could be defined in the clamp to guide a cerclage cable around the bone. In such instances, the two surgical instruments are combined into one. The clamp could additionally be designed to be operated with one hand allowing the other hand to route the cerclage cable along the cable pathway and around the bone.

The improved design of a reduction clamp allows the use of an improved method for cerclage cable passage around a femoral fracture, for example. The features of the device allow the surgeon to adhere to the principle of "staying on the bone" in order to avoid soft tissue interposition, while also allowing cable passage without the need for adjusting or moving the reduction clamp and without the need for additional cable-passing tools. The new design and shape of the clamp arm specifically allow ease of insertion through a smaller area of exposure while maintaining clearance required for fracture reduction, plate placement, and/or cerclage cable passage and tensioning. The handle and trigger mechanism design can facilitate one-handed placement, ease-of-adjustment and/or positioning around the fracture, and provides ergonomic innovations for efficient and optimal fracture reduction, plate application, and cerclage cable passage.

In various instances, the new design can offer significant advantages in the ability to reduce and stabilize a fracture, position and secure a compression plate if desired, and pass a cerclage cable using the same tool, without the need for repositioning the tool or requiring additional exposure to make room for a separate cable-passing tool. The novel design, dimensions, and shape of the clamp relative to the bone and patient's anatomy may help facilitate fracture reduction and cable passage with less exposure. Additionally the new design eliminates the need for any leveraging against muscle for cable passage. This can facilitate cable passage with potentially less exposure, and less pressure and force on surrounding musculature. These features may therefore add significant efficiencies for femur fracture reduction and stabilization, and potentially allow less exposure and diminished blood loss.

In various instances, the bone reduction clamp described herein can perform at least three distinct functions: diaphyseal fracture reduction and stabilization; plate placement, positioning and stabilization; and cerclage cable passage.

In one aspect, a surgical instrument can comprise a handle and a trigger pivotably coupled to the handle, wherein the trigger is movable between a first position and a second position. The surgical instrument can also include a shaft extending from the handle, wherein the shaft comprises a distal end forming a hook. The surgical instrument can also include a clamp arm extending from the handle and mechanically coupled to the trigger, wherein movement of the trigger from the first position toward the second position moves the clamp arm toward the hook. The surgical instrument can also include a ratchet or locking mechanism mechanically coupled to the clamp arm, wherein the ratchet mechanism is configured to prevent movement of the trigger toward the first position at incremental positions between the first position and second position.

FIGS. 1-16 illustrate components of a surgical assembly including a surgical instrument 100 and a surgical accessory 200 for use therewith. The distal end of the surgical instrument 100 may be in the shape of a hook 140 defining a curvature and dimension for clamping onto a particular bone, such as the femur, for example. In use, the hook 140 may be routed around a bone 300 and between the bone 300 and any muscles therearound. Once the hook is in place, an actuation trigger 120 may be squeezed toward a handle 110 to cause the clamp arm 150 to move distally toward the bone 300 to clamp the bone 300 between the hook 140 and the clamp arm 150. The clamp arm 150 can be held in position by a ratcheting mechanism, or lock mechanism, 160. To unclamp the bone 300, a release trigger 162 may be pressed to release the ratcheting mechanism 160 and allow the clamp arm 150 to move proximally away from the bone 300.

If a cerclage cable is desired around the bone 300, then the surgical accessory, or attachment tool, 200 may be coupled to the end of the hook 140 to provide a cable pathway around the bone 300, when the bone 300 is clamped. Once the surgical accessory 200 is in place, a cerclage cable can be routed around the bone 300 and tightened to secure the bone 300. In the clamped configuration, the distal end of the surgical instrument 100 and the distal end of the surgical accessory 200 form a generally circular perimeter around the bone 300. In certain instances, the surgical instrument 100 can be utilized for rod fixation and/or plate fixation.

Referring to FIG. 1, a handle 110 is coupled to a shaft 130 that extends distally from the handle 110. The distal end of the shaft forms the hook 140. An actuation trigger 120 is pivotably coupled to the handle 110 and mechanically coupled to the clamp arm 150 so that movement of the actuation trigger 120 is configured to move the clamp arm 150. In one instance, a through-hole 116 extends through the handle 110 and the actuation trigger 120 and a bolt 114 may be secured through the through-hole 116. The actuation trigger 120 may then pivot around the bolt 114 when the actuation trigger 120 is squeezed. In various instances, the pivotable coupling of the actuation trigger 120 and handle 110 could be made by any means that allows the actuation trigger 120 to pivot relative to the handle 110. The actuation trigger 120 may be mechanically coupled to the clamp arm 150 through a coupling link 118. The coupling link may be pivotably coupled to an upright end portion of the actuation trigger 120 and pivotably coupled to the proximal end of the clamp arm 150.

The pivotable coupling could be made by any means that allows the coupling link 118 to pivot relative to the actuation trigger 120 and the clamp arm 150. For example, the pivotable coupling between the actuation trigger 120 and coupling link 118 could be made by a through-hole 124 in the coupling link 118 and the actuation trigger 120 where a rod or pin 122 is secured in the hole to allow the coupling link 118 to pivot relative to the actuation trigger 120. In another example, the pivotable coupling could be made by having a through-hole 124 in the coupling link and protrusions on the actuation trigger 120 that snap into the through-hole 124 in the coupling link 118 allowing the coupling link 118 to pivot relative to the actuation trigger 120. Alternative pivotable couplings are also contemplated. The pivotable coupling of the clamp arm 150 and the coupling link 118 can be made in a similar manner to that described above. The actuation trigger 120 can act as a lever arm coupled to the clamp arm 150, such that a pivoting motion of the actuation trigger is configured to displace the clamp arm 150.

Figure 11:
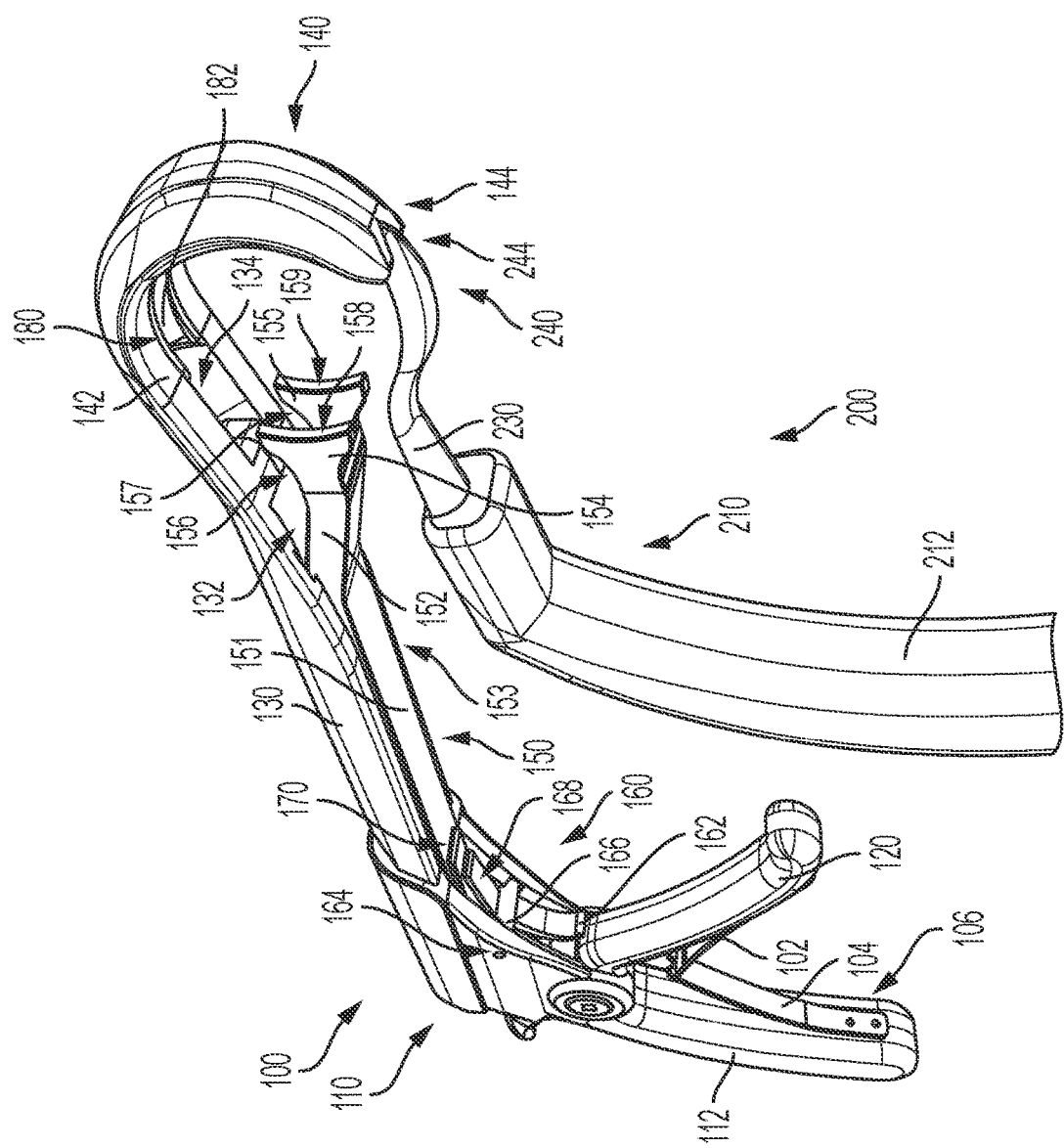
FIG. 11 is a perspective view of the surgical assembly of FIG. 1, according to at least one aspect of the present disclosure.
Figure 12:
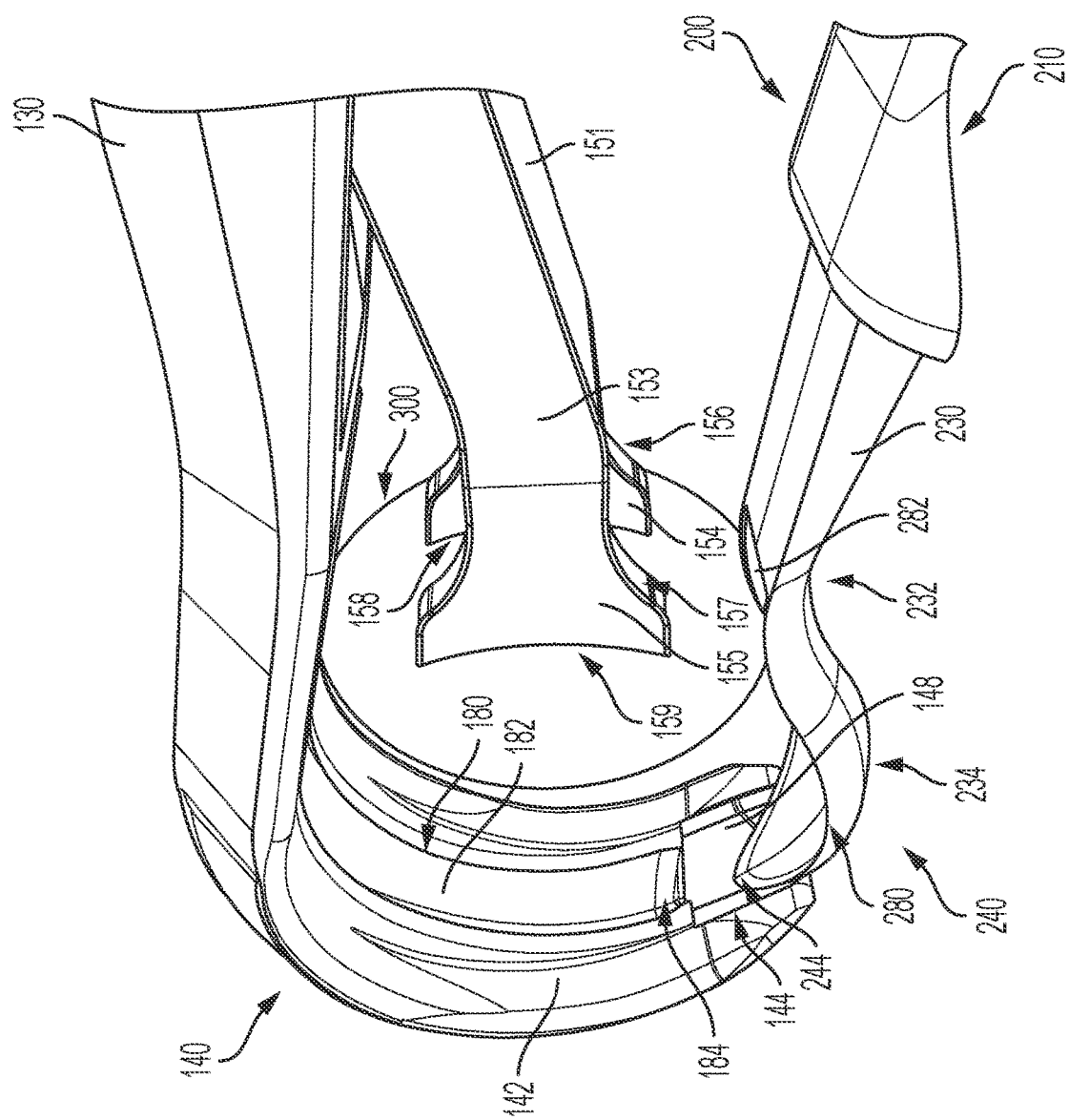
FIG. 12 is an elevation view of the distal end of the surgical assembly of FIG. 1, according to at least one aspect of the present disclosure.

Viewed best in FIGS. 11 and 12, in one instance, the clamp arm 150 comprises a solid beam having a first side 152, a bottom side 151, a second side 153, and a top side. The solid beam can define a substantially rectangular geometry that is configured to slide within grooves defined along an underside portion of the shaft 130. In other instances, the sides of the clamp arm 150 can comprise metal plates, for example, and the first and second sides 152, 153 may be attached to the bottom side 151 and/or top side with any means that allows a secure connection between the sides. In one instance, the side plates may be welded to a bottom plate. In an alternative instance, the side plates may be glued or otherwise fastened to the bottom plate. In yet another alternative instance, the connected plates can be formed from a single piece of metal (e.g. casting).

Referring to FIG. 1, in one instance, the pivotable coupling between the coupling link 118 and the clamp arm 150 could be made by a through-hole 126 in the coupling link 118 and the clamp arm 150 where a rod or pin 128 is secured in the through-hole 126 to allow the coupling link 118 to pivot relative to the clamp arm 150. For example, the through-hole 126 could extend through the first and second sides 152, 153 of the clamp arm 150 and the coupling link 118, where the rod 128 may extend through the through-hole 126 and attach to the sides 152, 153.

Figure 3:
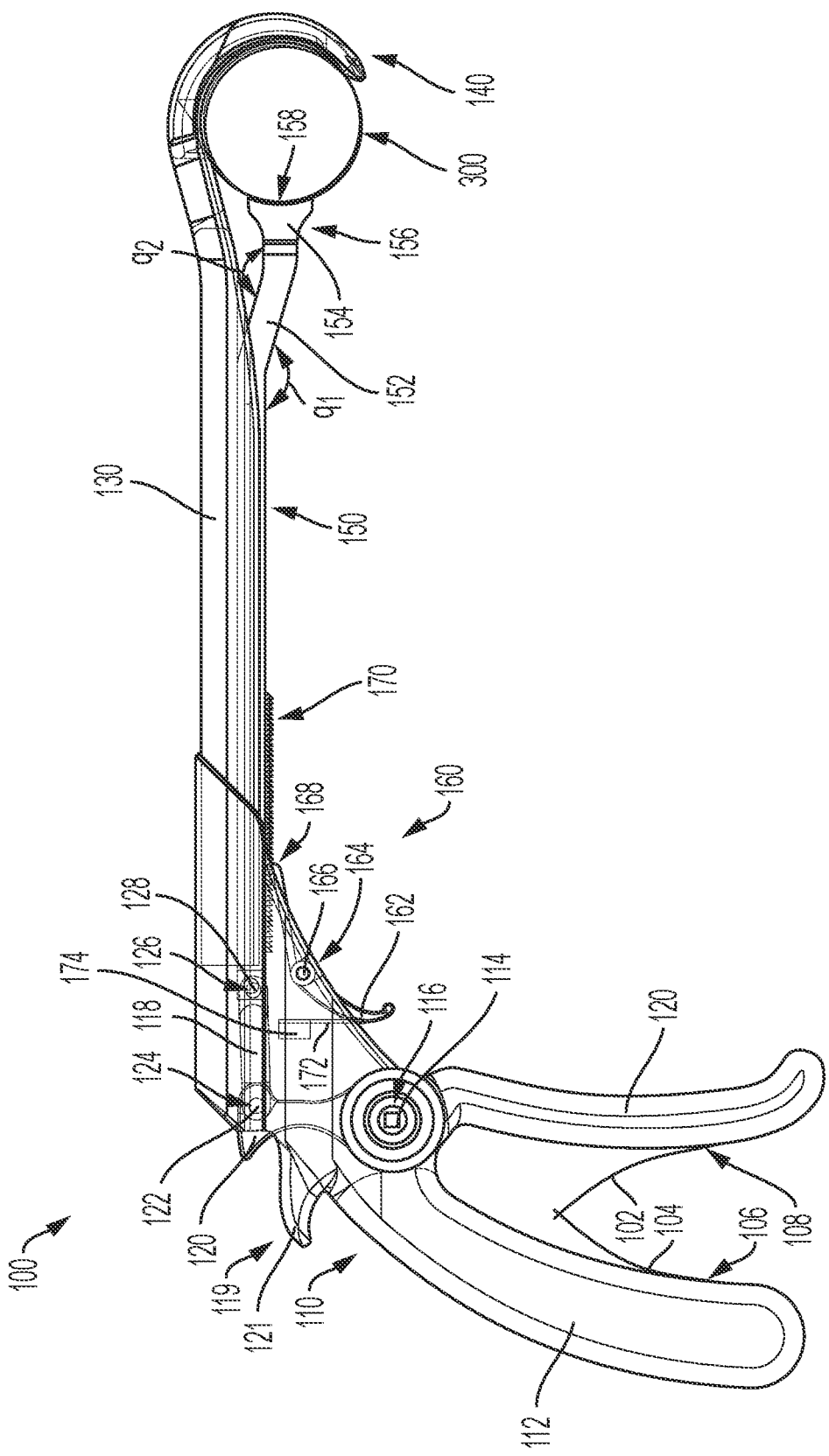
FIG. 3 is an elevation view of the surgical instrument of FIG. 1, depicting the surgical instrument in a closed configuration, according to at least one aspect of the present disclosure.

As seen in FIG. 11, the clamp arm 150 may extend along the shaft 130 through a channel 132 defined by the shaft 130. Referring to FIG. 3, the sides 152, 153 extend along the shaft 130 and prior to approaching the distal end of the clamp arm 150, the sides 152, 153 bend at an angle $\theta_1$ and extend away from the shaft 130 before bending at an angle $\theta_2$ to extend once again along the shaft. The two bends allow the distal end of the clamp arm 150 to be offset from the shaft 130 and positioned more centrally relative to the hook 140. Referring again to FIG. 11, the clamp arm 150 may comprise a bifurcated distal end. The bifurcated distal end may comprise two tines 154, 155 that are tapered. For example, tine 154 may attach to and/or extend from the side 152 and tine 155 may attach to and/or extend from the side 153. In one instance, the tine 154 may comprise a taper 156 that makes the distal end 158 of the tine 154 larger than the proximal end, and additionally, the tine 155 may comprise a taper 157 that makes the distal end 159 of the tine 155 larger than the proximal end. In one instance, the distal ends 158, 159 define a concave side profile curving inward in a proximal direction so that the distal ends 158, 159 are configured to securely press against a rounded surface, such as a cylindrical bone between the distal ends 158, 159 and the hook 140.

Figure 2:
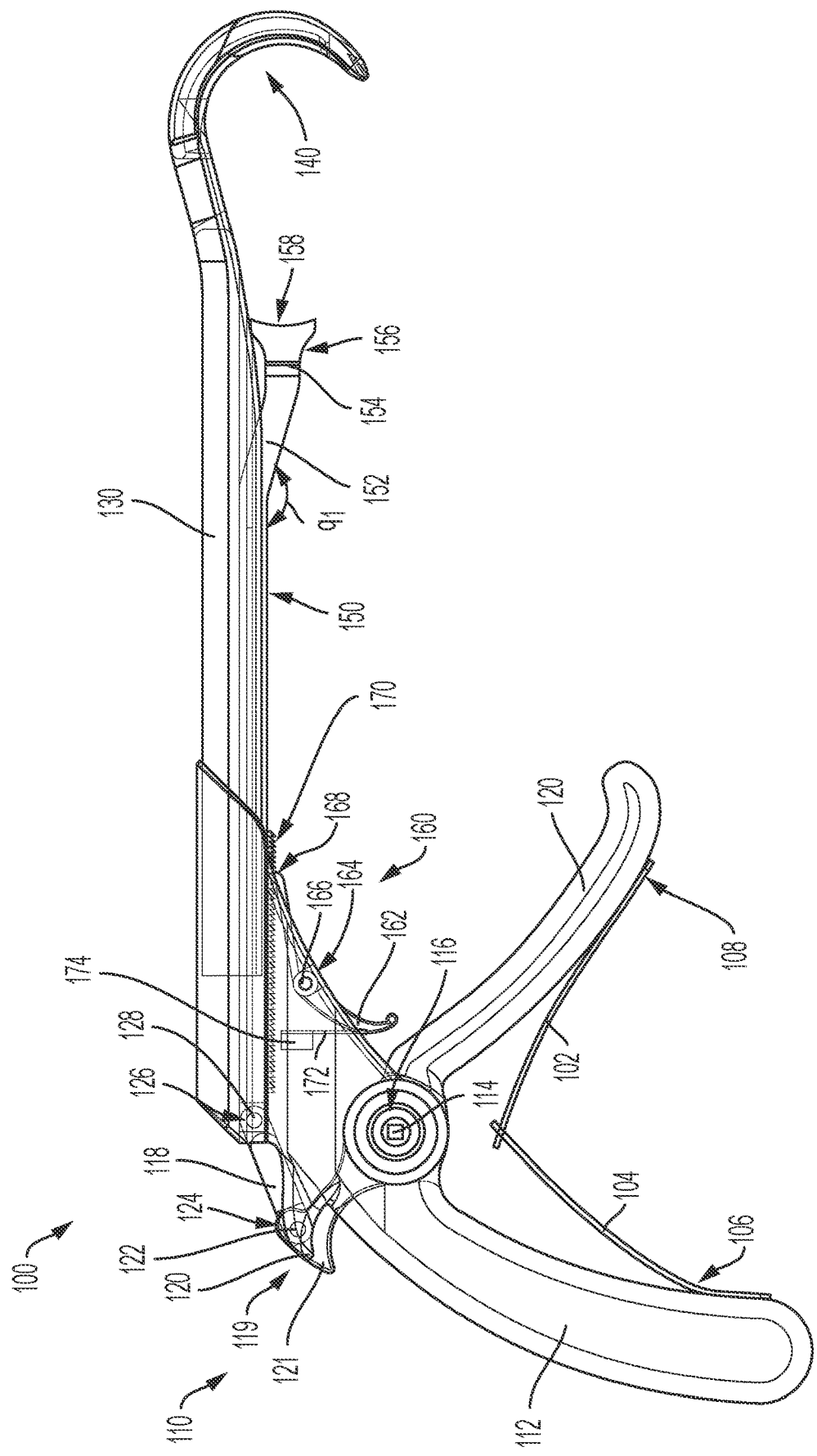
FIG. 2 is an elevation view of the surgical instrument of FIG. 1, depicting the surgical instrument in an open configuration, according to at least one aspect of the present disclosure.

FIG. 2 illustrates the surgical instrument 100 in an open configuration. Movement of the actuation trigger 120 is configured to move the surgical instrument 100 from the open configuration toward a fully closed configuration, shown in FIG. 3. The actuation trigger 120 may move to various incremental positions between the fully open configuration and the fully closed configuration. In various instances, activation of the actuation trigger 120 may move the clamp arm 150 distally. For example, movement of the actuation trigger 120 from a first position toward a second position moves the clamp arm 150 distally toward the hook 140. When the actuation trigger 120 is in the first position, the surgical instrument 100 may be in the fully open configuration, where the clamp arm 150 is located at its proximal most position. When the actuation trigger 120 is pivoted to its second position, the surgical instrument 100 may be in the fully closed configuration, where the clamp arm 150 is located at its distal most position. In various instances, the clamp arm 150 may move less than 10 cm from the open configuration to the closed configuration. In one instance, the clamp arm 150 may move approximately 2.6 cm from the open configuration to the closed configuration.

FIGS. 4-7 show detailed views of a ratcheting mechanism 160 that is coupled to the clamp arm 150. In various instances, the ratcheting mechanism 160 may be configured to prevent movement of the actuation trigger 120 toward the first position at incremental positions between the first position and second position. For example, the ratcheting mechanism 160 prevents the clamp arm 150 from moving proximally from various incremental positions between the open configuration and the closed configuration, while allowing the clamp arm 150 to move distally toward the hook 140. The ratcheting mechanism 160 may comprise a release trigger 162 that is pivotably coupled to the handle 110 and configured to release the ratcheting mechanism 160, when pressed, to allow the clamp arm 150 to move proximally.

Figure 5:
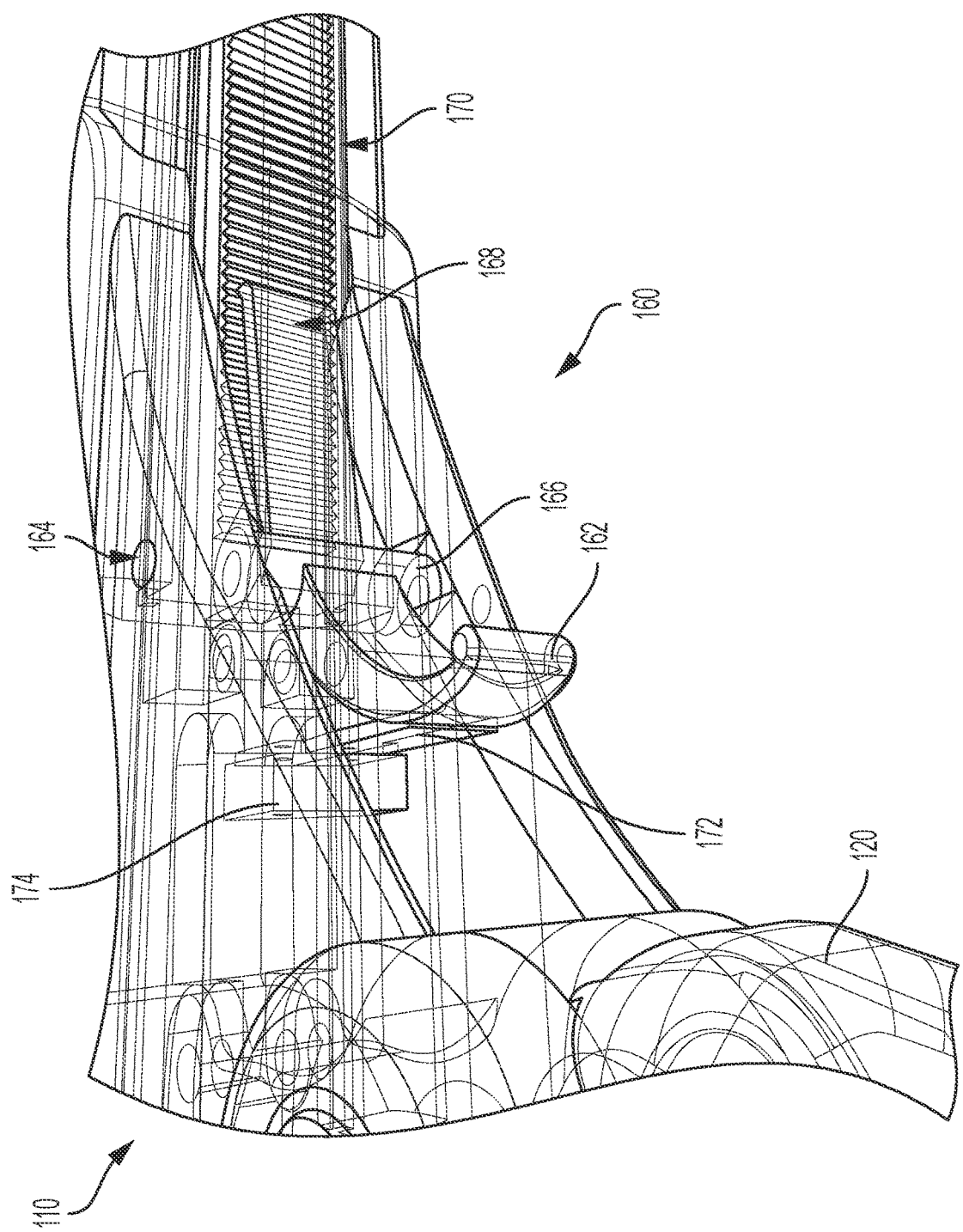
FIG. 5 is a perspective view of a portion of the surgical instrument of FIG. 1 depicting the release trigger thereof, according to at least one aspect of the present disclosure.
Figure 6:
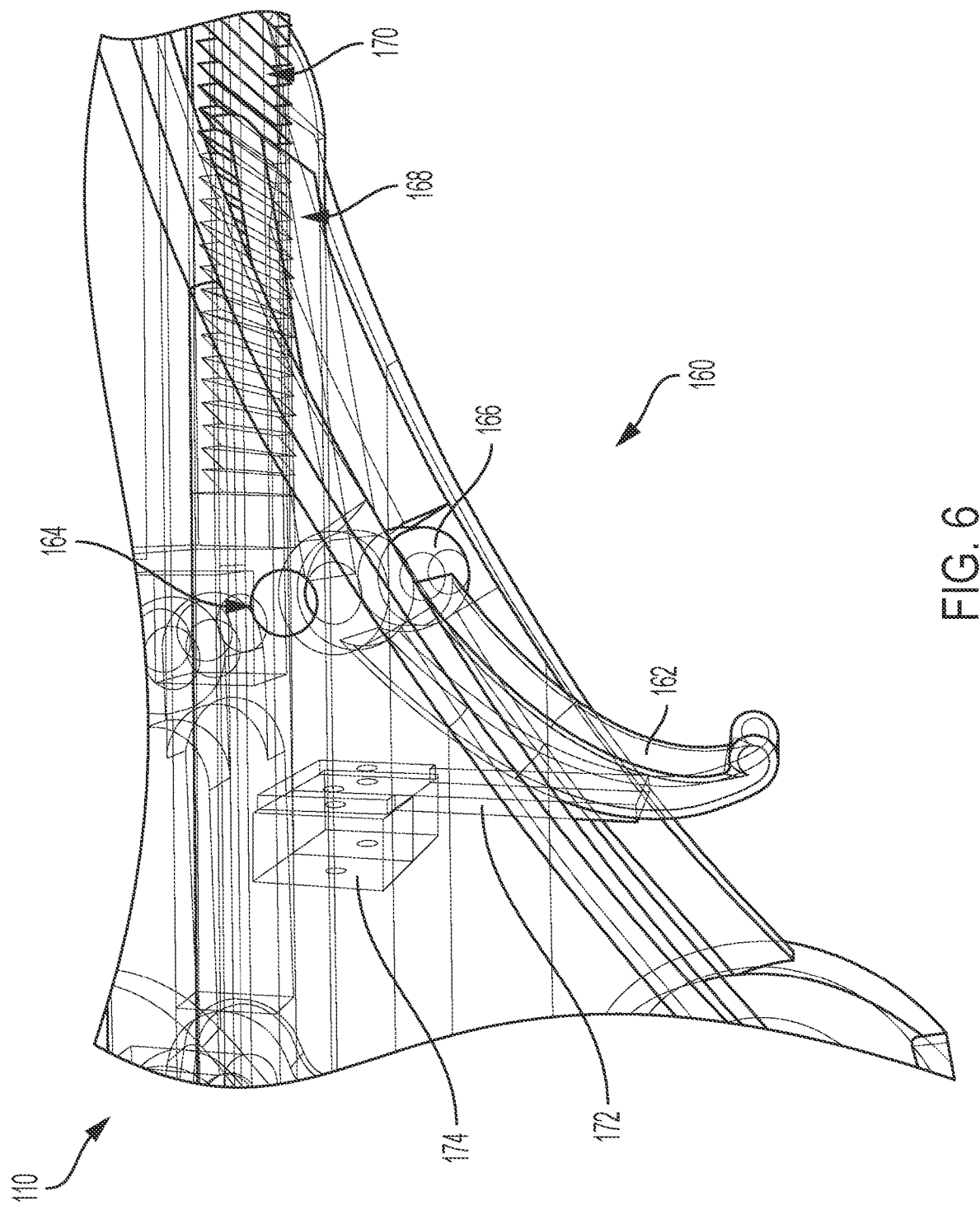
FIG. 6 is a perspective view of a portion of the surgical instrument of FIG. 1 depicting the release trigger thereof, according to at least one aspect of the present disclosure.

Referring to FIG. 5, in one instance, the handle 110 may comprise a through-hole 164 and the release trigger 162 may comprise protrusions 166 extending away from the release trigger 162 and into the through-hole 164, which allow the release trigger 162 to pivot relative to the handle 110. In various other instances, the release trigger 162 may be coupled to the handle 110 by any means that allows the release trigger 162 to pivot relative to the handle 110, such as a through-hole and bolt or rod. The release trigger 162 may comprise a locking portion 168 that can be configured to selectively mate with the clamp arm 150. In one instance, locking portion 168 of the release trigger 162 may selectively mate with a groove of a plurality of grooves 170 defined proximally along the bottom side 151 of the clamp arm 150. As seen best in FIG. 6, each groove in the plurality of grooves 170 is angled so that the locking portion 168 may be mating engaged and still slide from one groove to the next allowing the clamp arm 150 to be advanced distally, while keeping the clamp arm 150 from moving in the proximal direction past the currently-mated groove. The release trigger 162 may be moved between a locked position, in which the locking portion 168 is matingly engaged with the clamp arm 150, and an unlocked position, in which the locking portion 168 is moved away from the clamp arm 150. In one aspect, when the locking portion 168 is in the unlocked position, the clamp arm 150 is free to move in the proximal direction.

Figure 7:
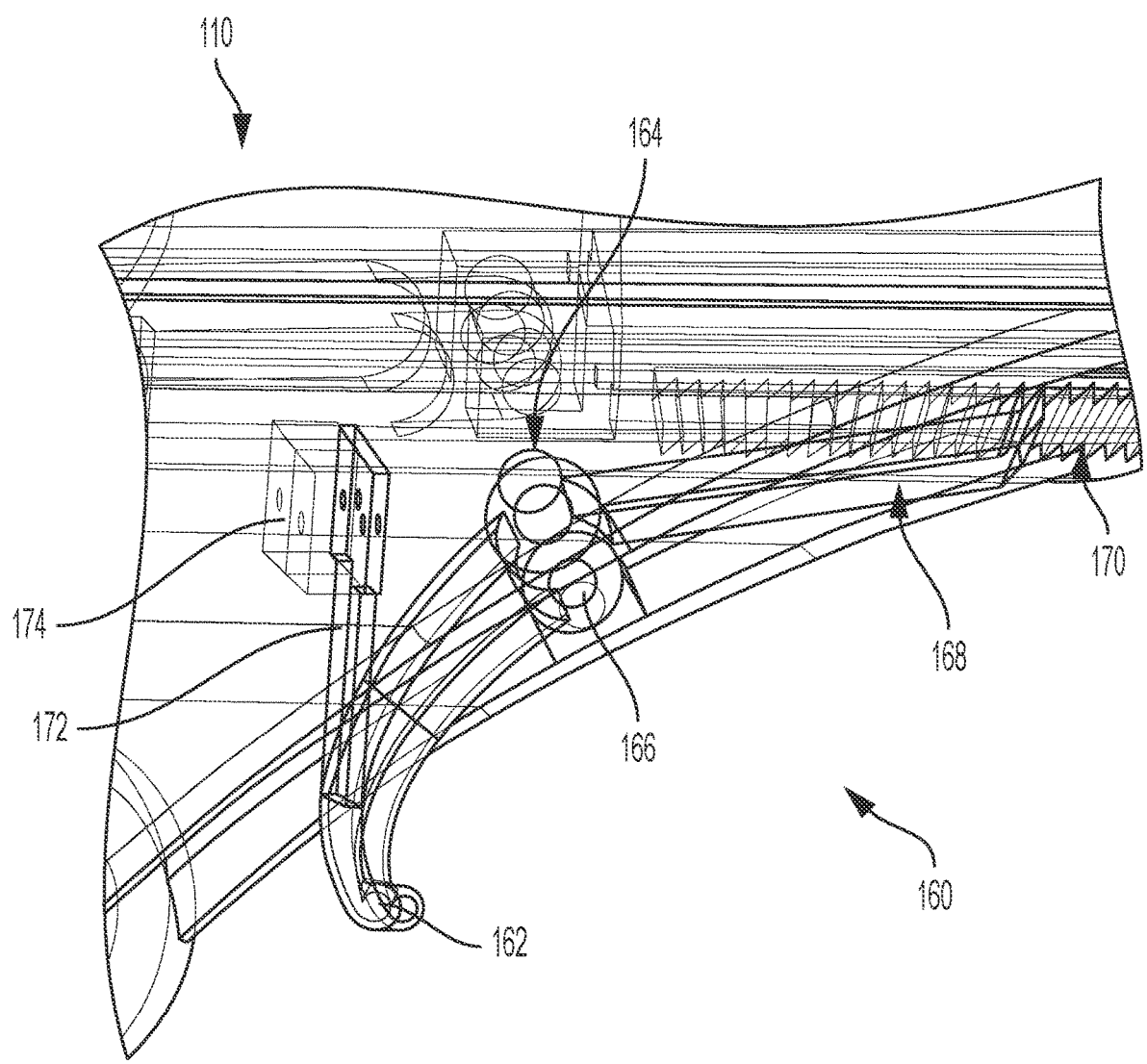
FIG. 7 is a perspective view of a portion of the surgical instrument of FIG. 1 depicting the release trigger thereof, according to at least one aspect of the present disclosure.

Referring to FIG. 7, a spring 172 may bias the release trigger 162 to the locked position. The spring 172 could be attached to a protrusion 174 attached inside of the handle 110. In one aspect, the spring 172 could comprise a resilient or spring-loaded plate that rests against the release trigger 162 holding it in the locked position. For example, pressing the release trigger 162 could cause the plate to temporarily bend allowing the release trigger 162 to move to the unlocked position. Upon releasing the release trigger 162, the spring 172 could bias the release trigger 162 back to the locked position where the locking portion 168 is once again matingly engaged with the clamp arm 150.

Figure 4:
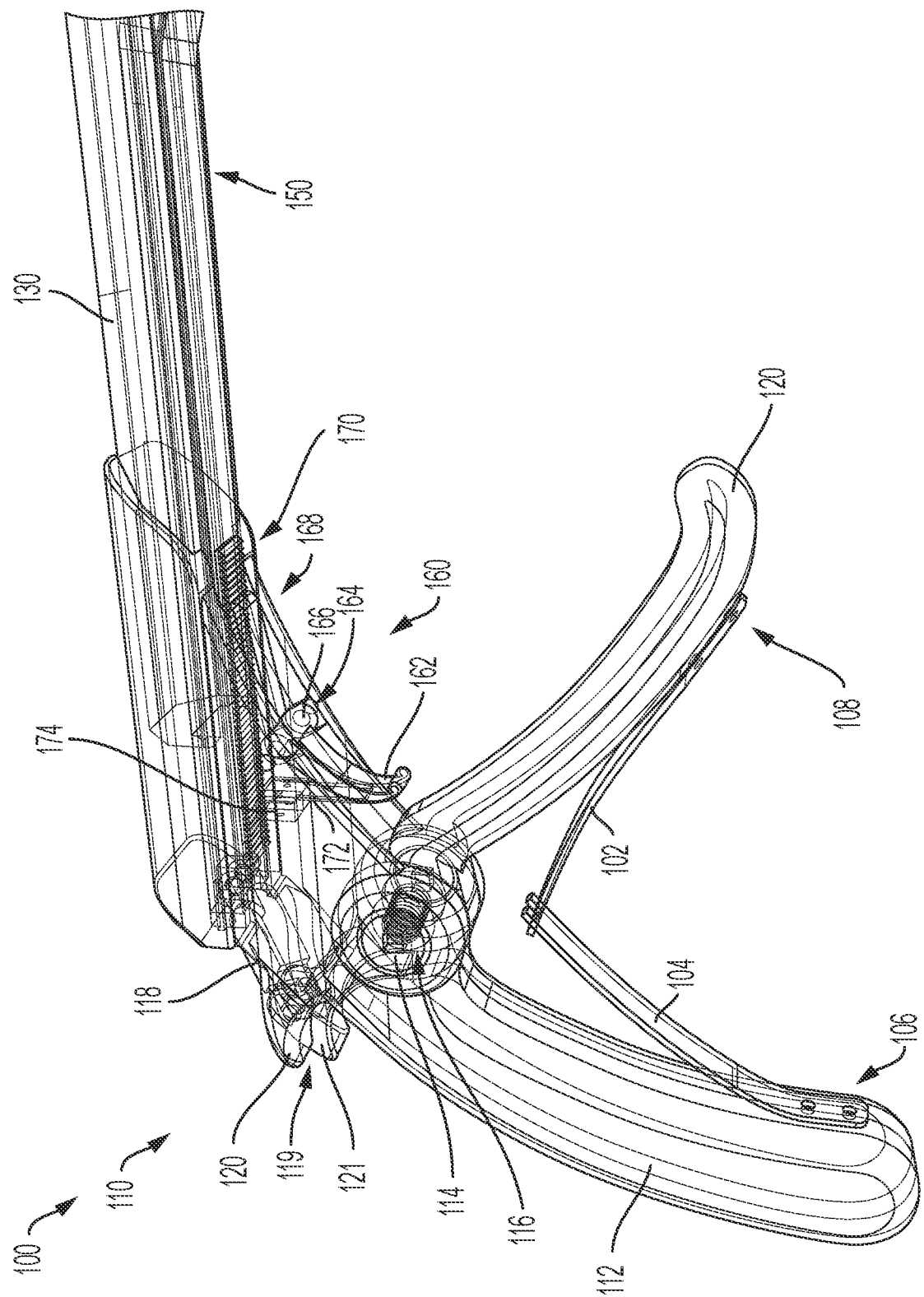
FIG. 4 is a perspective view of the handle portion of the surgical instrument of FIG. 1, according to at least one aspect of the present disclosure.

In various aspects, the locking portion 168 being matingly engaged with the clamp arm 150 also prevents movement of the actuation trigger 120 toward the first position. For example, movement of the actuation trigger 120 toward the second position may move the clamp arm 150 distally while movement of the actuation trigger 120 toward the first position may move the clamp arm 150 proximally. In one aspect, when the locking portion 168 is matingly engaged with the clamp arm 150, the clamp arm 150 may be prevented from moving proximally and thus the actuation trigger 120 may be prevented from moving toward the first position. Referring to FIG. 4, spring members 104, 102 may bias the actuation trigger 120 toward the first position. The spring members 104, 102 are flat springs coupled at their free ends. The proximal end of the spring member 104 may be attached to the handle 110 at a location 106 on a gripping portion 112 of the handle 110. In one aspect, the spring member 104 may be screwed to the handle at location 106. In other aspects, the proximal end of the spring 104 can be attached to the handle 110 at location 106 in any manner, such as gluing the spring 104 or sliding the spring into a slot in the actuation trigger 120, for example. The distal end of the spring member 102 may be attached to the actuation trigger 120 at location 108. In one aspect, the distal end of the spring member 102 may be screwed to the handle at location 108. In other aspects, the spring member 102 can be attached to actuation trigger 120 at location 108 in any manner, such as gluing the spring member 102 or sliding the spring into a slot in the actuation trigger 120, for example. The free ends of the spring members 102, 104 can be coupled to form a V-shaped compression spring.

Figure 8:
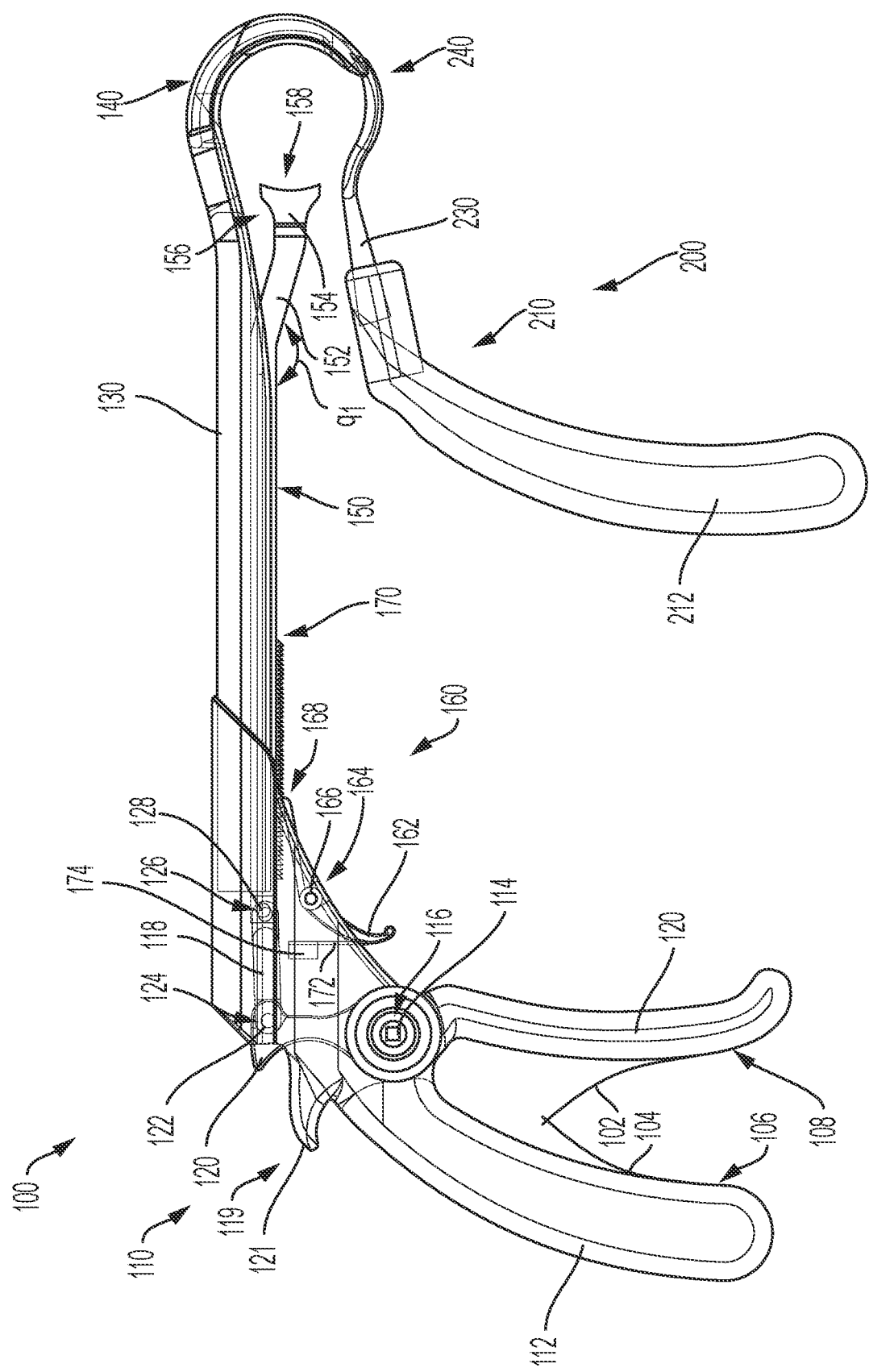
FIG. 8 is an elevation view of the surgical assembly of FIG. 1, according to at least one aspect of the present disclosure.

When the actuation trigger 120 is in the first position, the spring members 102, 104 may be mostly straight providing little bias to the actuation trigger 120. As the actuation trigger 120 moves toward the second position the spring members 102, 104 may begin to flex, as shown in FIG. 8, applying a larger bias. When the release trigger 162 moves from the locked position to the unlocked position, the clamp arm 150 may be moved proximally by the spring members 104, 102 that bias the actuation trigger 120 toward the first position. The biasing force may move the actuation trigger 120 toward the first position until the actuation trigger 120 presses against the stop protrusion 121. In one aspect, the stop protrusion 121 may prevent the actuation trigger 120 from opening too wide. In one aspect, the stop protrusion 121 could comprise a channel 119 for the actuation trigger 120 to rest within as shown in FIG. 2. In other aspects, the actuation trigger 120 could rest directly against the stop protrusion 121.

For example, when the release trigger 162 is pressed, it may move from the locked position to the unlocked position and the ratcheting mechanism 160 may be released allowing the clamp arm 150 to move proximally and the actuation trigger 120 to move toward the first position due to the biasing force caused by spring members 102, 104. In various other instances, the biasing force to move the actuation trigger 120 toward the first position could be generated by one spring or any number of springs. In other various instances, the ratcheting mechanism 160 could be replaced with any generic locking mechanism that allows movement in one direction and prevents movement in the opposite direction until the locking mechanism is released.

In various aspects, the handle 110 comprises a gripping portion 112. The gripping portion 112 may allow a single hand to be within reach of the actuation trigger 120 and the release trigger 162. Stated another way, the handle 110 may have a gripping portion 112 and the actuation trigger 120 may extend away from the gripping portion 112 and the release trigger 162 may be located slightly above the gripping portion. Both the release trigger 162 and the actuation trigger 120 could be within reach for a single hand of a user. For example, this design allows a single hand to move the actuation trigger 120 to move the clamp arm 150 distally toward the hook and, when desired, to release the clamp arm 150 by pressing the release trigger 162. When the release trigger 162 is pressed, the clamp arm 150 is moved proximally, automatically due to the biasing force of the spring members 102, 104 that automatically move the actuation trigger 120 toward the first position. In various aspects, the design allows the clamp arm to be actuated distally, locked in place, and then released when desired by a single hand of a user. The handle 110 can be referred to as a pistol grip handle for single-handed actuations, in certain instances.

Figure 9:
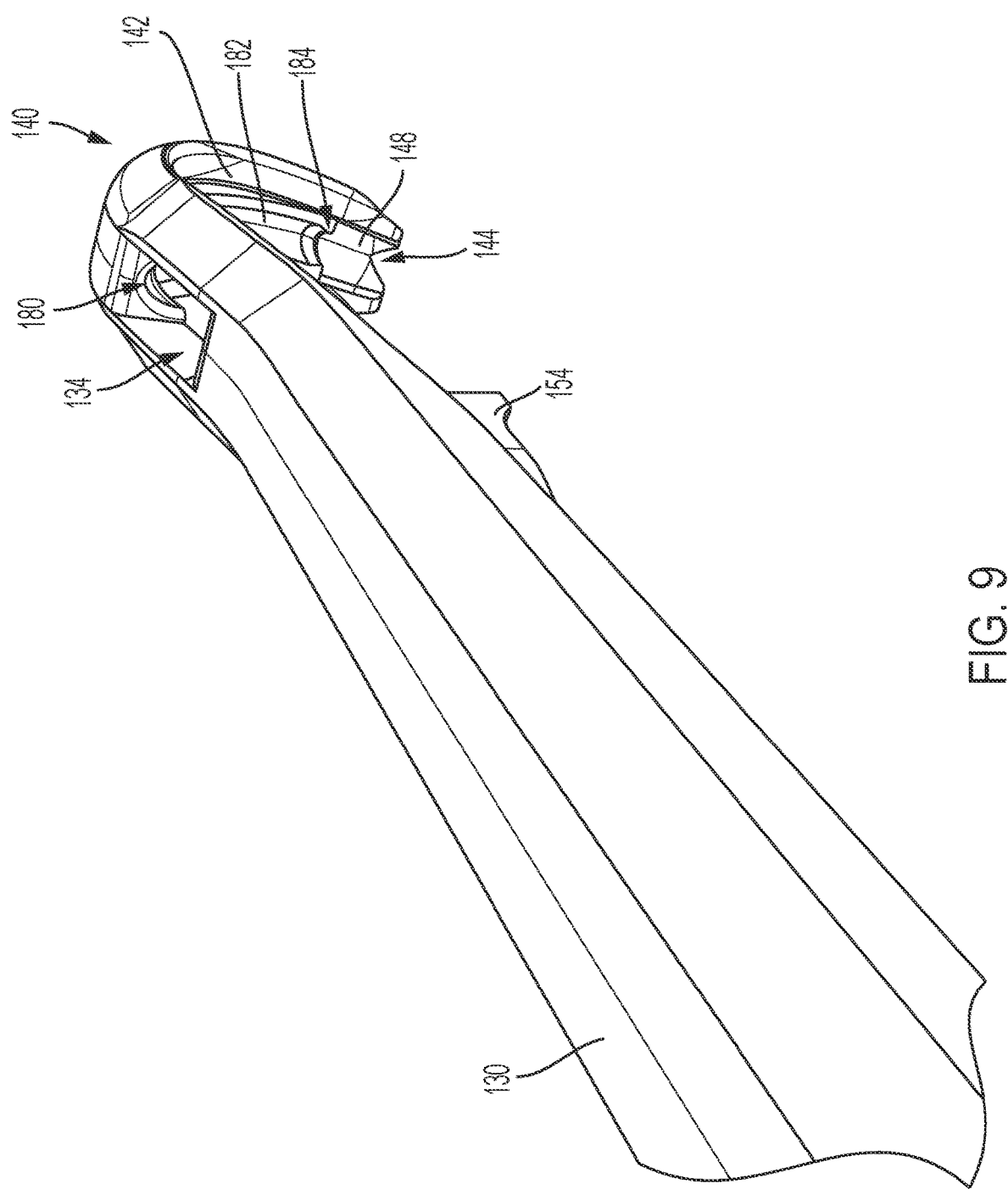
FIG. 9 is a perspective view of the distal portion of the surgical instrument of FIG. 1, according to at least one aspect of the present disclosure.
Figure 10:
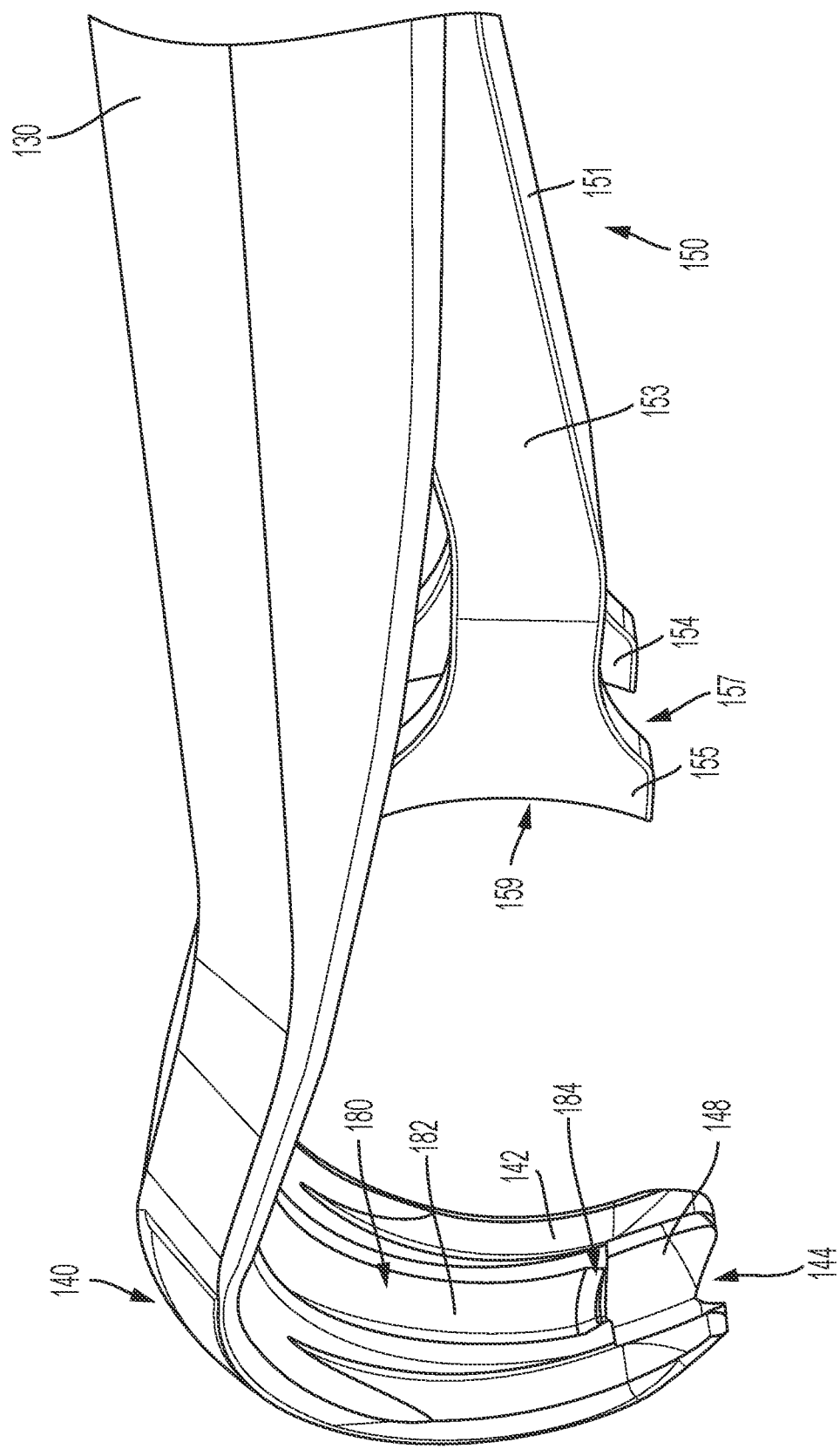
FIG. 10 is a perspective view of the distal portion of the surgical instrument of FIG. 1, according to at least one aspect of the present disclosure.

The surgical instrument 100 additionally provides a cable pathway 180 to guide a cerclage cable around a bone. In various aspects, the hook 140 may comprise the cable pathway 180. Referring to FIG. 9, a window 134 may be defined through the shaft 130 toward the distal end at the base of the hook 140. When the surgical instrument 100 is in the closed configuration, the window 134 provides access and visibility between the tines 154, 155 of the clamp arm 150. The beginning of the cable pathway 180 may be visible through the window 134. Referring to FIG. 10, in one aspect, the cable pathway 180 may comprise a channel 182 defined along the interior curve of the hook 140. In other aspects, the cable pathway 180 could be defined in a tube that goes along the hook 140 on the interior or exterior side of the curve of the hook 140. In various aspects, the interior surface 142 of the hook 140 may be flat to provide more surface area against a clamped bone and to avoid damage to the bone during clamping. The channel 182 extends along the entire length of the interior curve of the hook 140. To provide a cable pathway that goes around the bone when clamped, the surgical accessory 200 can be mated with the distal end 144 of the hook 140.

Figure 13:
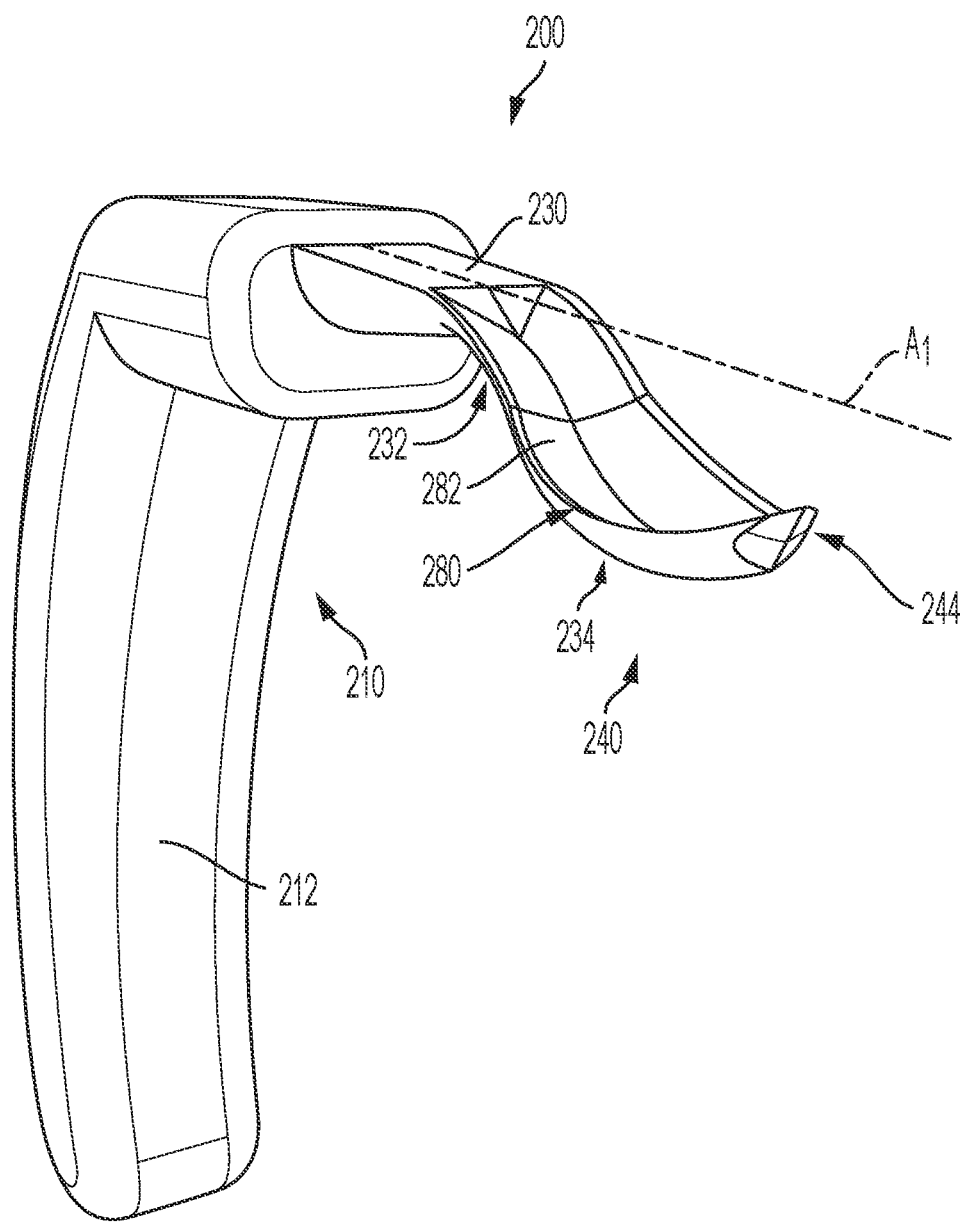
FIG. 13 is a perspective view of the surgical accessory of FIG. 1, according to at least one aspect of the present disclosure.
Figure 14:
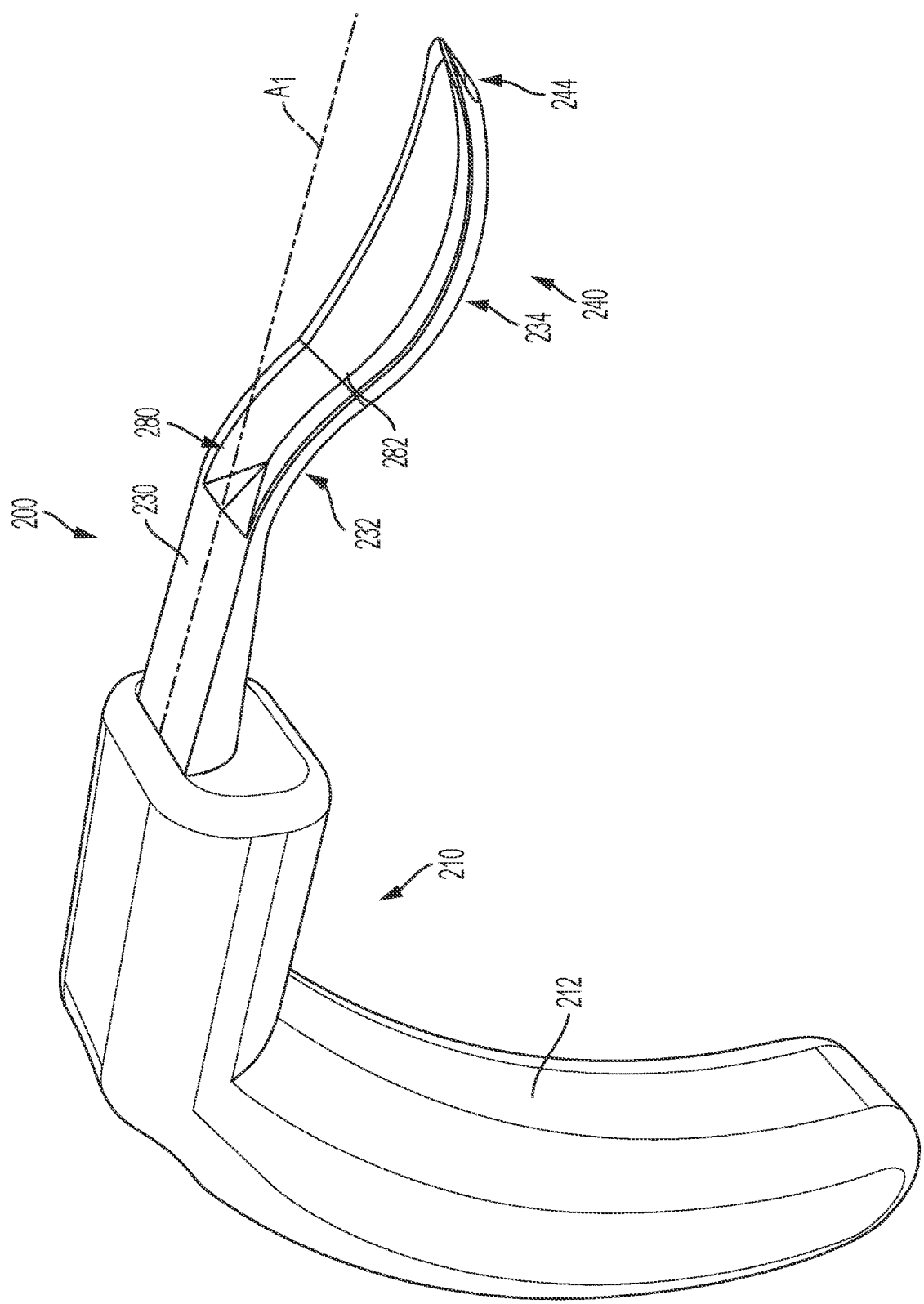
FIG. 14 is a perspective view of the surgical accessory of FIG. 1, according to at least one aspect of the present disclosure.

FIGS. 13 and 14 illustrate isometric views of the surgical accessory 200. The surgical accessory 200 comprises a handle 210 that has a gripping portion 212 and a shaft 230 that extends distally from the handle 210 and terminates at a distal end 244. The shaft 230 defines a longitudinal axis $A_1$. As the shaft 230 extends distally, the shaft 130 defines a bend 232 away from the longitudinal axis $A_1$ and then a bend 234 back toward the longitudinal axis $A_1$. The shaft 230 may comprise a second cable pathway 280, where the second cable pathway 280 may comprise a channel 282 defined by the shaft 230. For example, the channel 282 may be defined along the interior curve of the bends 232, 234 of the shaft 230. The shaft 230 may comprise a distal portion 240 that ends at the distal end 244, and which may be configured to mate with the distal end 144 of the hook 140, as shown in FIGS. 11 and 12.

Referring to FIG. 12, the distal end 244 may slide into the channel 148 of the distal end 144 of the hook 140 until it rests under a shoulder or edge 184. When the distal end 244 slides fully into place and mates with the distal end 144 of the hook, then the shaft 230 may extend proximally away from the hook between the two tines 154, 155 of the bifurcated distal end of the clamp arm 150. Additionally, when the distal end 144 and the distal end 244 are mated, then the second cable pathway 280 aligns with the cable pathway 180. Docking of the distal ends 144, 244 can provide tactile feedback to the surgeon that the cable pathways 180, 280 are aligned even when the bone 300 obstructs the surgeon's view or direct visualization by the surgeon is otherwise prevented. When the cable pathways 180, 280 are aligned, the cable pathway 180 at the edge 184 is laterally aligned with the cable pathway 280; however, the lowestmost surfaces of the pathways 180, 280 are not flush at the edge 184. Rather, the edge 184 is configured to act as a cable lift for a cable being guided in the cable pathway 180 to ensure the cable does not get caught, jammed, or misdirected as it transitions from the cable pathway 180 and enters the cable pathway 280.

Figure 15:
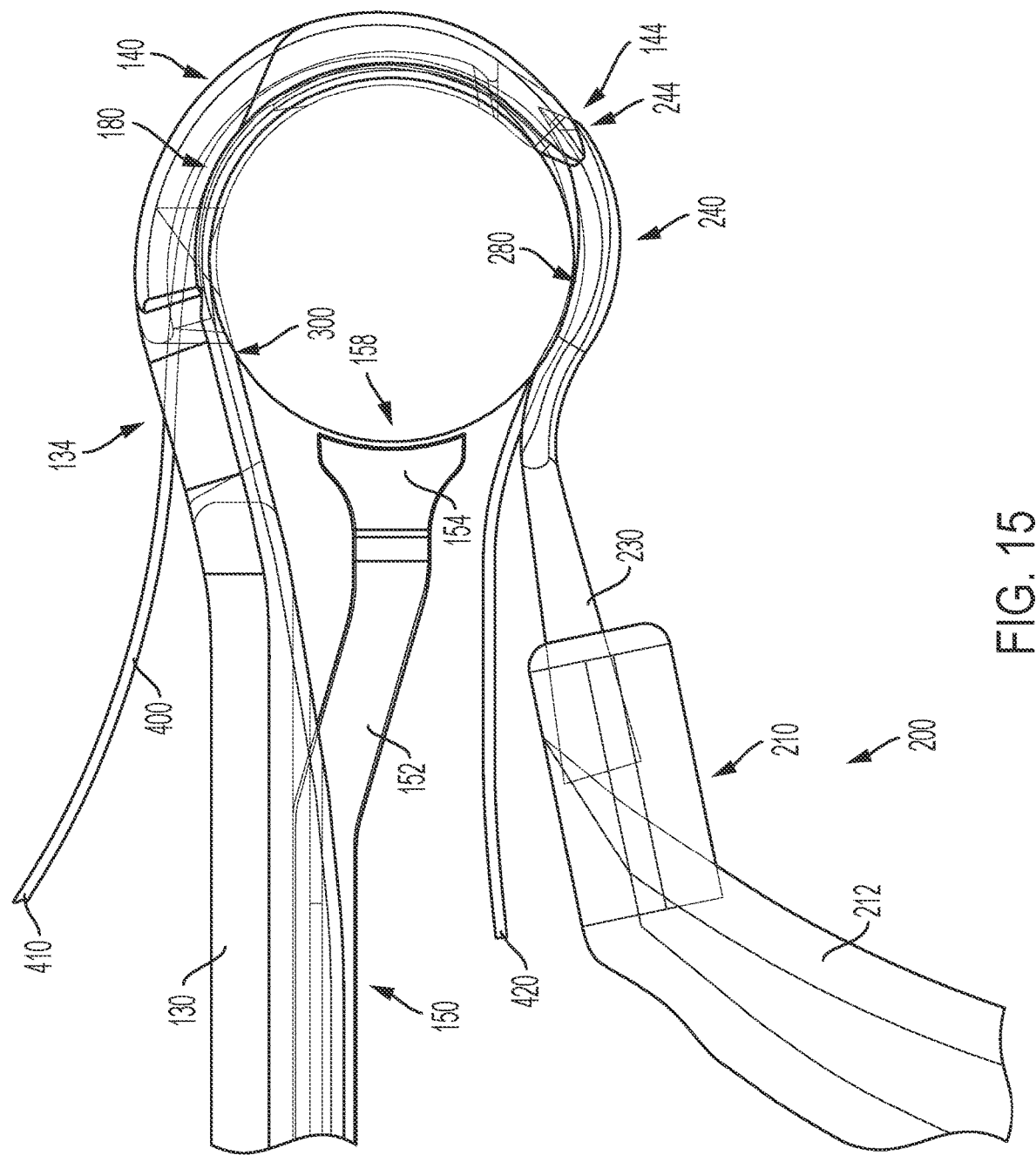
FIG. 15 is an elevation view of the distal end of the surgical assembly of FIG. 1, illustrating a cable pathway, according to at least one aspect of the present disclosure.
Figure 16:
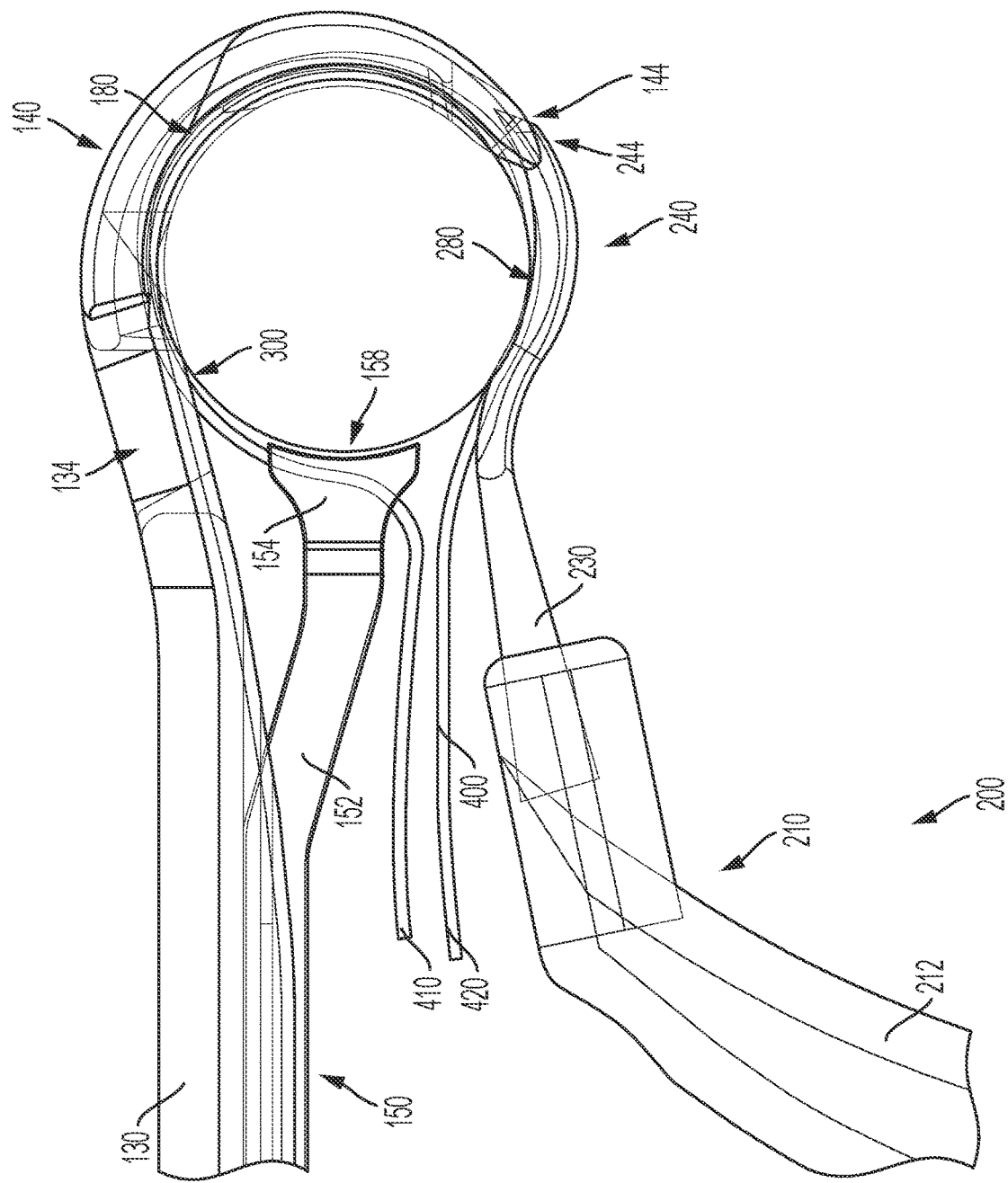
FIG. 16 is an elevation view of the distal end of the surgical assembly of FIG. 1, illustrating a cable pathway, according to at least one aspect of the present disclosure.

FIG. 15 shows a cable 400 being guided through the window 134 and along the cable pathways 180, 280 around the bone 300. The cable end 420 may be guided through the window 134 and into the cable pathway 180. The cable pathway 180 may guide the cable end 420 around the bone 300 and into the cable pathway 280. The cable end 420 may continue along the cable pathway 280 until it exists between the tines 154, 155. Then the cable end 410 may be guided through the window 134 and between the tines 154, 155 as shown in FIG. 16. Then, the cable ends 410, 420 may be coupled to each other so that the cable tightens against the bone 300.

Figure 17:
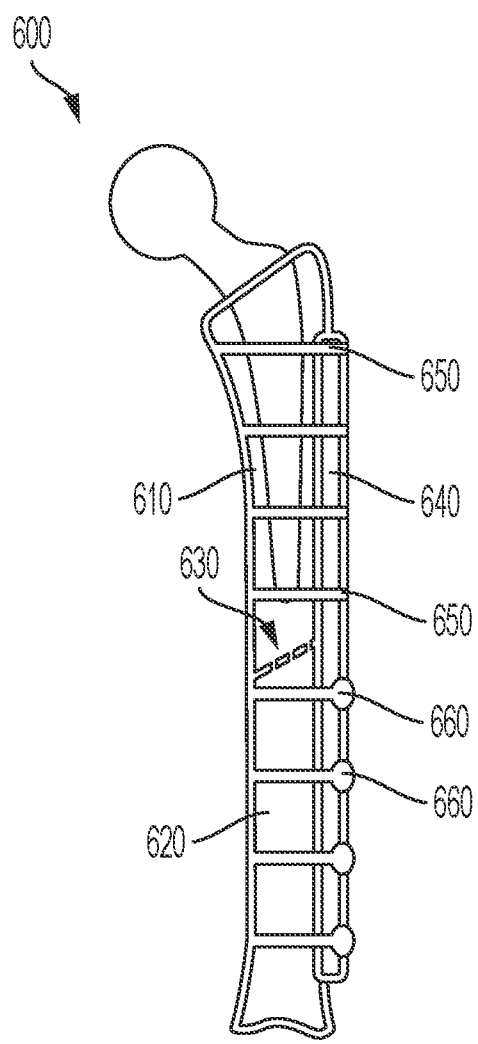
FIG. 17 is a diagram of a repaired bone fracture, according to at least one aspect of the present disclosure.

FIG. 17 illustrates a diagram 600 of a bone fracture 630 being repaired by attaching a plate 640 to an upper portion 610 and a lower portion 620 of the bone. The upper portion 610 is attached to the plate 640 by cables 650 that are tightened around the bone and plate 640. The lower portion 620 is attached to the plate by bicortical screws 660.

In use, the hook 140 of the surgical instrument may be used to hook around a bone 300 and below muscle. A plate, such as the plate 640, may be placed between the bone 300 and the distal end of the clamp arm 150. The actuation trigger 120 may be tightened so that the clamp arm 150 moves toward the hook 140 and tightens against the bone 300 to clamp it and hold the bone 300 in place. If a plate is being used, then it would be held tight between the distal end of the clamp arm 150 and the bone 300. If a cable is desired to be routed around the bone, then the surgical accessory 200 may be mated to the end of the hook 140. The distal end 244 of the attachment tool fits or docks into the distal end 144 of the hook 140. In use, the mating of the ends 144, 244 cannot be seen but it can be felt through the gripper portions 112, 212 that the surgical instrument 100 and the surgical accessory 200 were mated correctly. A cable end 420 may then be guided through the window 134 and into the cable pathways 180, 280 to guide the cable 400 around the bone 300. Once the cable is around the bone, the surgical accessory 200 can be removed. Then the cable end 410 may be guided through the window 134 and between the tines 154, 155 of the clamp arm 150. Then, the cable end may be coupled together and the cable tightened against the bone. If a plate was used, then the cable may hold the plate tightly against the bone. Once the clamp is done being used, then the release trigger 162 may be pressed and the clamp arm 150 may move proximally away from the hook to release the bone. The hook 140 may then be moved to unhook the bone.

EXAMPLES

Various aspects of the subject matter described herein are set out in the following numbered examples.

Example 1. A surgical instrument that comprises a handle, and a trigger pivotably coupled to the handle, wherein the trigger is movable between a first position and a second position. The surgical instrument further comprises a shaft extending from the handle, wherein the shaft comprises a distal end forming a hook. The surgical instrument further comprises a clamp arm extending from the handle and mechanically coupled to the trigger, wherein movement of the trigger from the first position toward the second position moves the clamp arm toward the hook. The surgical instrument further comprises a ratchet mechanism mechanically coupled to the clamp arm, wherein the ratchet mechanism is configured to prevent movement of the trigger toward the first position at incremental positions between the first position and the second position.

Example 2. The surgical instrument of Example 1, wherein the ratchet mechanism comprises a release trigger pivotably coupled to the handle. The release trigger comprises a locking portion configured to selectively mate with the clamp arm. The release trigger is movable between a locked position, in which the locking portion is matingly engaged with the clamp arm and configured to prevent displacement of the clamp arm away from the hook, and an unlocked position, in which the locking portion is moved away from the clamp arm. The ratchet mechanism comprises further comprises a spring, wherein the spring biases the release trigger toward the locked position.

Example 3. The surgical instrument of Example 2, wherein the release trigger is configured to release the ratchet mechanism and allow movement of the trigger toward the first position from incremental positions between the first position and the second position.

Example 4. The surgical instrument of any one of Examples 2 or 3, further comprising a second spring positioned and structured to bias the trigger toward the first position.

Example 5. The surgical instrument of Example 4, wherein the second spring is configured to move the trigger toward the first position when the release trigger is in the unlocked position.

Example 6. The surgical instrument of any one of Examples 1 through 5, wherein the distal end of the clamp arm comprises a bifurcated distal end.

Example 7. The surgical instrument of Example 6, wherein the bifurcated distal end comprises a pair of tines, and wherein each tine comprises a rounded distal end.

Example 8. The surgical instrument of Example 7, further comprising a second handle and a second shaft extending distally from the second handle and terminating at an end portion configured to mate with the hook, and wherein the second shaft is configured to extend proximally from the hook between the pair of tines of the bifurcated distal end of the clamp arm.

Example 9. A surgical instrument that comprises a handle, and a trigger pivotably coupled to the handle, wherein the trigger is movable between a first position and a second position. The surgical instrument further comprises a shaft extending from the handle, wherein the shaft comprises a distal end forming a hook. The surgical instrument further comprises a clamp arm extending from the handle and mechanically coupled to the trigger, wherein movement of the trigger from the first position to the second position moves the clamp arm toward the hook. The hook comprises a cable pathway. The surgical instrument further comprises a locking mechanism mechanically coupled to the clamp arm, wherein the locking mechanism is configured to prevent movement of the trigger toward the first position at incremental positions between the first position and the second position.

Example 10. The surgical instrument of Example 9, wherein a window is defined through the shaft.

Example 11. The surgical instrument of Example 10, wherein the distal end of the clamp arm comprises a bifurcated distal end comprising a pair of tines, wherein the cable pathway is located between the pair of tines, and wherein the window provides visibility to a cable in the cable pathway between the pair of tines.

Example 12. The surgical instrument of any one of Examples 9 through 11, wherein the cable pathway comprises a channel defined along an interior curve of the hook.

Example 13. The surgical instrument of any one of Examples 11 or 12, wherein the surgical instrument further comprises a second handle and a second shaft extending distally from the second handle and terminating at an end portion configured to mate with the hook, wherein the second shaft is configured to extend proximally from the hook between the pair of tines of the bifurcated distal end of the clamp arm, and wherein the second shaft comprises a second cable pathway.

Example 14. The surgical instrument of Example 13, wherein the second shaft defines a longitudinal axis, wherein the distal end of the shaft bends away from the longitudinal axis and then back toward the longitudinal axis, and wherein the second cable pathway comprises a second channel defined along the interior curve of the distal end.

Example 15. The surgical instrument of Example 13, wherein the second cable pathway comprises a second channel defined by the second shaft, and wherein the second cable pathway is aligned with the cable pathway of the hook when the end portion of the second shaft and the hook are mated.

Example 16. The surgical instrument of any one of Examples 14 or 15, wherein when the second cable pathway is aligned with the cable pathway of the hook, a first edge of the channel in the hook is offset from a second edge of the second channel.

Example 17. A surgical instrument that comprises a handle, and a trigger pivotably coupled to the handle, wherein the trigger is movable between a first position and a second position. The surgical instrument further comprises a shaft extending from the handle, wherein the shaft comprises a distal end forming a hook. The surgical instrument further comprises a clamp arm extending from the handle and mechanically coupled to the trigger, wherein movement of the trigger from the first position to the second position moves the clamp arm toward the hook. The surgical instrument further comprises a locking mechanism mechanically coupled to the clamp arm, wherein the locking mechanism is configured to prevent movement of the trigger toward the first position at incremental positions between the first position and the second position.

Example 18. The surgical instrument of Example 17, wherein the locking mechanism comprises a release trigger pivotably coupled to the handle. The release trigger comprises a locking portion configured to selectively mate with the clamp arm. The release trigger is movable between a locked position, in which the locking portion is matingly engaged with the clamp arm and configured to prevent displacement of the clamp arm away from the hook, and an unlocked position, in which the locking portion is moved away from the clamp arm. The locking mechanism further comprises a spring, wherein the spring biases the release trigger toward the locked position.

Example 19. The surgical instrument of Example 18, further comprising a second spring positioned and structured to bias the trigger toward the first position, wherein the second spring is configured to move the trigger toward the first position when the release trigger is in the unlocked position.

Example 20. The surgical instrument of any one of Examples 18 or 19, wherein the handle comprises a pistol grip comprising an upright gripping portion and the trigger extending away from the upright gripping portion, and wherein the release trigger is located slightly above the upright gripping portion such that a user can actuate, lock, and release the clamp arm with a single hand.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "an instance", "on instance", "one aspect," "an aspect," "an exemplification," "one exemplification," and the like means that a particular feature, structure, or characteristic described in connection with the aspect is included in at least one aspect. Thus, appearances of the phrases, "in one instance", "in an instance", "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system, comprising:
    a surgical instrument, comprising:
        a handle;
        a trigger pivotably coupled to the handle, wherein the trigger is movable between a first position and a second position;
        a shaft extending from the handle, wherein the shaft comprises a distal end forming a hook, wherein the hook comprises a channel extending along an interior curve of the hook to define a cable pathway around a bone, and wherein a fully enclosed window is defined through the shaft at an intermediate location along a length of the shaft to provide access to the cable pathway;
        a clamp arm extending from the handle and mechanically coupled to the trigger, wherein movement of the trigger from the first position toward the second position moves the clamp arm along a longitudinal axis of the shaft such that the clamp arm advances distally toward the hook to clamp the bone between the hook and the clamp arm; and
        a ratchet mechanically coupled to the clamp arm, wherein the ratchet is configured to prevent movement of the trigger toward the first position at incremental positions between the first position and the second position; and
        a cable configured to extend through the fully enclosed window and into the cable pathway for guidance around the bone.

2. The system of claim 1, wherein the ratchet comprises:
    a release trigger pivotably coupled to the handle, wherein the release trigger comprises a locking portion configured to selectively mate with the clamp arm, wherein the release trigger is movable between a locked position, in which the locking portion is matingly engaged with the clamp arm and configured to prevent displacement of the clamp arm away from the hook, and an unlocked position, in which the locking portion is moved away from the clamp arm; and
    a spring, wherein the spring biases the release trigger toward the locked position.

3. The system of claim 2, wherein the release trigger is configured to release the ratchet and allow movement of the trigger toward the first position from the incremental positions between the first position and the second position.

4. The system of claim 2, further comprising a second spring positioned and structured to bias the trigger toward the first position, wherein the second spring is configured to move the trigger toward the first position when the release trigger is in the unlocked position.

5. The system of claim 1, wherein the clamp arm comprises a bifurcated distal end, wherein the bifurcated distal end comprises a pair of tines, and wherein each tine comprises a rounded distal end.

6. The system of claim 5, further comprising a second handle and a second shaft extending distally from the second handle and terminating at an end portion configured to mate with the hook, wherein the second shaft is configured to extend proximally from the hook, wherein the second shaft comprises a second channel extending along an interior side of the second shaft, and wherein the second channel defines a second cable pathway to guide the cable around the bone.

7. The system of claim 1, wherein the hook comprises a proximal end and a distal end, and wherein the proximal end and the distal end of the hook are offset by at least 90 degrees.

8. A system, comprising:
a surgical instrument, comprising:
a handle;
a trigger pivotably coupled to the handle, wherein the trigger is movable between a first position and a second position;
a shaft extending from the handle, wherein the shaft comprises a first side, a second side opposite to the first side, a distal end forming a hook, and a shoulder, wherein the hook comprises an elongated channel defined radially into the second side of the shaft and extending along an interior curve of the hook, and wherein a fully enclosed window is defined through the shaft from the first side to the second side at an intermediate location along a length of the shaft to provide access to the elongated channel;
a clamp arm extending from the handle and mechanically coupled to the trigger, wherein movement of the trigger from the first position to the second position moves the clamp arm toward the hook to clamp a bone between the hook and the clamp arm; and
a lock mechanically coupled to the clamp arm, wherein the lock is configured to prevent movement of the trigger toward the first position at incremental positions between the first position and the second position; and
an attachable surgical accessory comprising:
a second handle; and
a second shaft extending distally from the second handle and terminating at an end portion, wherein the second shaft comprises a second elongated channel defined radially into the second shaft and extending distally along an interior curve of the second shaft, wherein the end portion is dimensioned and structured to abut the shoulder of the shaft to laterally align the elongated channel in the shaft and the second elongated channel in the second shaft to form a cable pathway comprising a distally-extending length and a proximally-extending length to guide a cable through the fully enclosed window, at least partially around a bone clamped between the hook and the clamp arm, and back in a proximal direction.

9. The system of claim 8, wherein the clamp arm comprises a bifurcated distal end comprising a pair of tines, and wherein the fully enclosed window provides visibility to the cable in the elongated channel between the pair of tines.

10. The system of claim 8, wherein the second shaft defines a longitudinal axis, and wherein a distal end of the second shaft bends away from the longitudinal axis and then back toward the longitudinal axis.

11. The system of claim 10, wherein the cable pathway extends along a curvature of at least 180 degrees.

12. The system of claim 9, wherein when the second elongated channel is aligned with the elongated channel of the hook, the shoulder is vertically offset from an edge of the second elongated channel.

13. The system of claim 8, wherein the clamp arm is configured to press a plate against the bone and the cable is configured to secure the plate to the bone.

14. The system of claim 9, wherein the handle and the second handle provide tactile feedback to a user when the end portion of the second shaft and the hook are mated.

15. The system of claim 8, further comprising the cable positionable through the fully enclosed window and into the cable pathway at least partially around the bone clamped between the hook and the clamp arm.

16. A surgical instrument, comprising:
a handle;
a trigger pivotably coupled to the handle, wherein the trigger is movable between a first position and a second position;
a shaft extending from the handle, wherein the shaft comprises a first side, a second side opposite to the first side, and a distal end forming a bone hook, wherein the bone hook comprises an elongated cable-receiving channel defined radially inward on the second side of the shaft and extending along an interior curve of the bone hook, wherein a fully enclosed through-hole is defined through the shaft at an intermediate location along a length of the shaft from the first side to the second side to provide access to the elongated cable-receiving channel;
a clamp arm extending from the handle and mechanically coupled to the trigger, wherein movement of the trigger from the first position to the second position moves the clamp arm along a longitudinal axis of the shaft such that the clamp arm advances distally toward the bone hook to clamp the bone between the bone hook and the clamp arm; and
a cable configured to be pushed in a distal direction through the fully enclosed through-hole from the first side to the second side, into the elongated cable-receiving channel, circumferentially around a bone and back in a proximal direction.

17. The surgical instrument of claim 16, further comprising a lock mechanically coupled to the clamp arm, wherein the lock is configured to prevent movement of the trigger toward the first position at incremental positions between the first position and the second position, wherein the lock comprises:
a release trigger pivotably coupled to the handle, wherein the release trigger comprises a locking portion configured to selectively mate with the clamp arm, wherein the release trigger is movable between a locked position, in which the locking portion is matingly engaged with the clamp arm and configured to prevent displacement of the clamp arm away from the bone hook, and an unlocked position, in which the locking portion is moved away from the clamp arm; and
a spring, wherein the spring biases the release trigger toward the locked position.

18. The surgical instrument of claim 17, further comprising a second spring positioned and structured to bias the trigger toward the first position, wherein the second spring is configured to move the trigger toward the first position when the release trigger is in the unlocked position.

19. The surgical instrument of claim 17, wherein the handle comprises a pistol grip comprising an upright gripping portion and the trigger extending away from the upright gripping portion.

20. The surgical instrument of claim 17, wherein the handle, the trigger, and the release trigger are disposed on a same side of the shaft within reach for a single hand of a user.

* * * * *